Patented Aug. 1, 1944

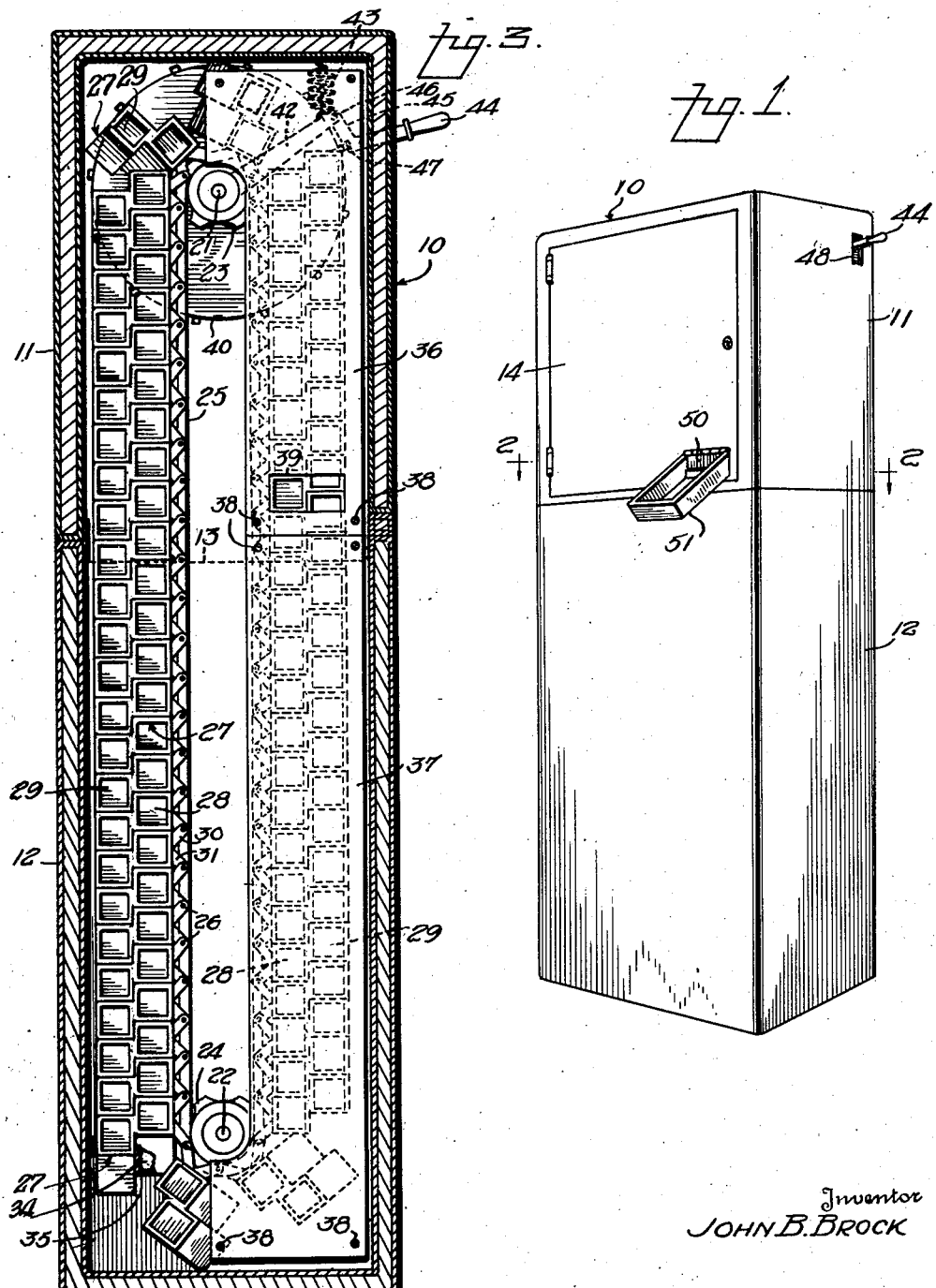

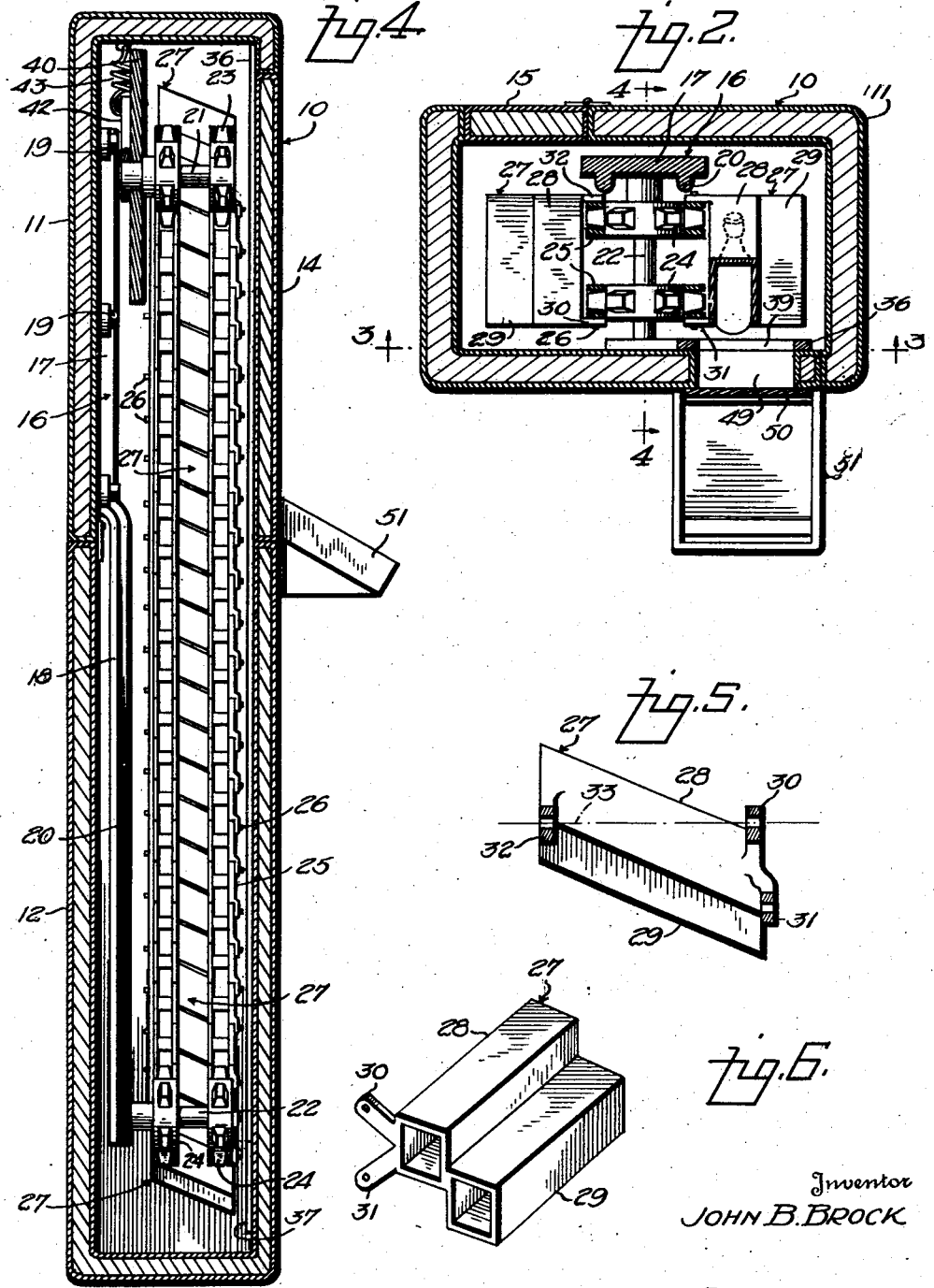

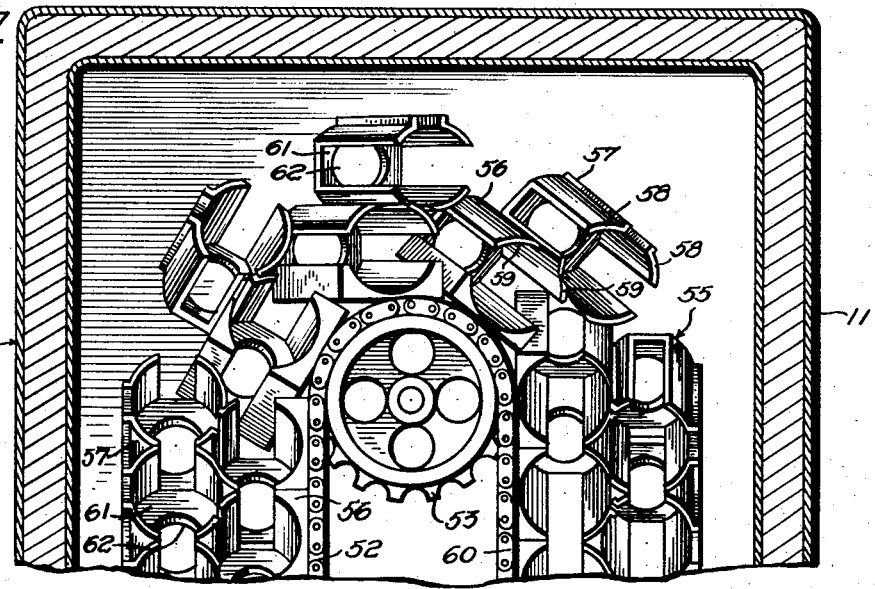
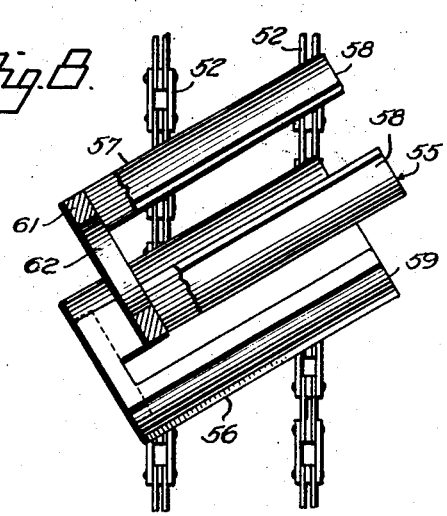 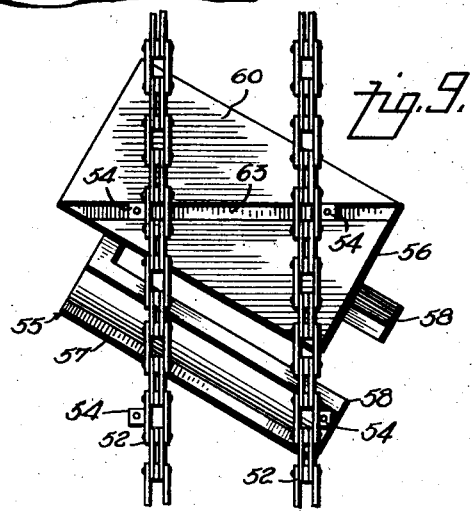
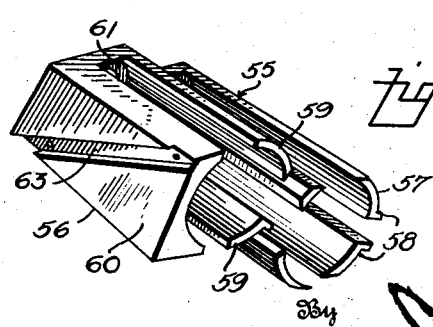

2,354,939

UNITED STATES PATENT OFFICE 2,354,939

CONVEYING MECHANISM

John B. Brock, Adairsville, Ga., assignor to Jessie Hatcher Cutler, Columbus, Ga.

Original application January 9, 1939, Serial No. 250,044, now Patent No. 2,254,208, dated September 2, 1941. Divided and this application July 29, 1941, Serial No. 404,571

8 Claims. (Cl. 198—131)

This invention relates to a conveying mechanism and more particularly to a conveying mechanism for a dispensing apparatus, and is a division of my copending application Serial No. 250,044, filed January 9, 1939, and now issued into Patent No. 2,254,208, granted Sept. 2, 1941.

In my copending application referred to I have disclosed a dispensing apparatus particularly intended for the dispensing of refrigerated bottles of soft drinks and the like wherein mechanism is mounted within a refrigerator casing to hold therein a substantial number of bottles to be cooled, with means for moving the bottles one by one to a dispensing opening. The apparatus embodies a mechanism for effecting movement of the bottle carrier step by step so as to dispense one bottle at a time. The bottle carrying means in the apparatus referred to preferably is in the form of an endless chain device to which are connected in a novel manner a plurality of bottle holders so arranged with respect to each other as to be brought one at a time into a position to dispense the bottles from the apparatus.

An important object of the present invention is to provide novel bottle holding and conveying means, such means being disclosed but not claimed in my copending application referred to.

More specifically an object of the invention is to provide conveying means particularly for use with a dispensing apparatus wherein rows of article carriers are provided in adjacent parallel relationship with the carriers of each row in relatively close proximity to each other and with the carriers of the different rows arranged in staggered or off-set relationship so that articles of the successive rows will be brought into registration with a dispensing opening to be dispensed one at a time, such arrangement of the carriers of the different rows providing a mechanism of greatly increased article-carrying capacity.

A further object is to provide an article carrying conveyor of the general character referred to wherein the individual article carriers, during a given portion of their travel, move in a given vertical plane with the article carriers inclined from the horizontal to tend to discharge the articles from the carriers by gravity, and to operate the conveyor during such portion of the travel of the article carriers adjacent and parallel to a retaining plate having a dispensing opening therein, whereby the articles will be retained in the article holders until they successively reach the dispensing opening to be dispensed therethrough.

A further object is to provide such an apparatus wherein article carrier units are connected to a conveying chain mechanism and wherein each unit comprises a pair of horizontally and vertically off-set individual article holders, whereby first the article in one such holder and then the article in the other holder will come into registration with the dispensing opening to be thus individually dispensed.

A further object is to provide novel means for pivotally connecting the article-carrying units to the chain mechanism so that the units are angularly arranged during the portion of their travel referred to and still are free to pass around the chain supporting sprockets at the ends of the runs of the chain.

A further object is to provide a conveying mechanism wherein a pair of chains travel vertically and pass around sprockets at the ends of their runs, and to support with respect to the chains a plurality of article holders which are angularly inclined with respect to the runs of the chains and are pivoted to the chains on axes parallel to the axes of the sprockets whereby the article carriers are free to pass around the sprockets.

A further object is to provide a novel form of article carrier for conveyor chains wherein an integral article-carrying unit is pivoted to the chains on an axis transversely thereof and wherein each unit comprises a plurality of carriers for individual articles off-set from each other lengthwise with respect to the chains.

Other objects and advantages of the invention will become apparent during the course of the following description.

In the drawings I have shown two embodiments of the invention. In this showing:

Figure 1 is a perspective view of a dispensing mechanism employing the conveyor mechanism of the present invention and disclosing the dispensing device associated with the conveyor, Figure 2 is a horizontal sectional view taken substantially on line 2—2 of Figure 1, Figure 3 is a vertical sectional view on line 3—3 of Figure 2, Figure 4 is a similar view on line 4—4 of Figure 2, Figure 5 is an enlarged side elevation of one of the article holders having the supporting ears thereof shown in section to indicate the relative positions of the supporting pins, Figure 6 is a detail perspective view of one of the article holders, Figure 7 is an enlarged fragmentary sectional view similar to the upper end of Figure 3 showing a modified form of article holders, Figure 8 is a fragmentary side elevation of one of the article holders looking at the side thereof opposite the supporting chains, parts being broken away and parts being shown in section, Figure 9 is a similar view of the chain side of the article holder, showing the connection of the chain thereto, and Figure 10 is a detail perspective view of one of the article holders.

Referring to Figures 1 to 4 inclusive, the cabinet for the conveying mechanism is illustrated and is indicated as a whole by the numeral 10. The cabinet or casing is relatively narrow and comprises upper and lower sections 11 and 12 the latter of which may contain a refrigerant approximately to the level indicated by the numeral 13 in Figure 3. The upper casing section 11 is provided with a door 14 (Figures 1 and 4) through which access may be had to the mechanism to be described, and the back wall of the upper casing section may be provided with a door 15 (Figure 2) for the introduction of the cracked ice. The apparatus is particularly intended for use in the dispensing of chilled bottles of beverages, as fully set forth in the copending application referred to. While the present invention is not concerned in any respect with the means which may be employed for cooling the bottles, it may be mentioned that water chilled with cracked ice may be employed as the refrigerant, or the apparatus may be provided with mechanical refrigerating means.

A main supporting bracket 16 is arranged within the casing and comprises upper and lower sections 17 and 18, as shown in Figure 4. The upper section 17 of the supporting bracket lies flat against the back wall of the upper casing 11 and is bolted thereto as at 19. The lower bracket portion 18 is offset inwardly as shown in Figure 4 and is wholly free from the lower casing 12. The bracket 16 may be ribbed throughout its length as at 20 (Figures 2 and 4) to provide the bracket with a high degree of rigidity. The upper bracket portion 17 extends throughout the greater portion of the height of the upper casing 11 and accordingly acts as a brace for the rear wall of such casing. It will become apparent that the bracket supports the weight of the carriers to be described and the articles carried thereby.

Upper and lower shafts 21 and 22 are rigidly carried by the upper and lower bracket portions 17 and 18 and these shafts respectively support pairs of sprockets 23 and 24 about which pass endless chains 25. Each chain is made up of identical links of the same number, and these links are connected by pivot pins 26, the chain being of any conventional type except that the pivot pins 26 thereof are extended from the remote faces of the chain for a purpose to be described.

The two chains referred to support a plurality of article holders one of which is shown in detail in Figures 5 and 6 and indicated as a whole by the numeral 27. Each article holder is formed of a pair of units 28 and 29 rigidly secured to each other in offset relation as shown in Figures 3 and 6. It will be apparent that the sprockets 23 and 24 rotate in a clockwise direction as viewed in Figure 3 and accordingly the right hand runs of the chains in such figure are the downwardly moving runs. As the article holders pass over the top of the upper sprockets, the respective units 28 and 29 form a pair of adjacent series of article holding pockets. Each unit 28 overlaps the unit 29 of the next higher article holder while each unit 29 overlaps the unit 28 of the next lower article holder. Accordingly the successive units at the descending side of the apparatus are arranged in staggered relation, and on such side of the apparatus the article holders slope downwardly toward the front of the apparatus as shown in Figure 4. In this connection it will be noted that the right hand end of the article holder in Figure 5 is arranged adjacent the front or discharging face of the apparatus.

The forward end of each unit 28 is provided with a pair of diverging ears 30 and 31, while the rear end of the unit 28 is provided with the downwardly and angularly extending ear 32 (Figure 5). Each of the ears 30, 31 and 32 is provided with an opening, and the opening in each ear 30 is arranged in horizontal alignment with the corresponding ear 32 as indicated by the broken line 33 in Figure 5. Each ear 30 overlaps and has its opening in alignment with the ear 31 of the next higher article holder, and such overlapping openings receive one of the chain link connecting pins 26 of the chain adjacent the front of the apparatus. The opening in each ear 32 receives the corresponding pin 26 of the rear chain 25. Therefore it will be apparent that each article holder is supported at three points, namely, by two of the pins 26 of the forward chain 25 and by one of the pins 26 of the rear chain 25. Accordingly each article holder is bodily held in its proper position with respect to the chains. The alignment of the two chain pins which are in axial alignment with each of the lines 33 (Figure 5) insures the proper passing of each article holder around either pair of sprockets without distortion.

The rear ends of the units of the article holders may be closed as indicated by the numeral 34 (Figure 3) and at its lowermost point on the ascending side of the apparatus, each of the units 28 and 29 being provided with an opening 35 to drain water or other refrigerant from the unit. The forward ends of the units are open as shown in Figures 3 and 6, and since the units are sloped downwardly toward their forward ends on the descending sides of the chains, it will be apparent that any water or other refrigerant remaining in the units will freely drain therefrom on the descending side of the apparatus.

A retaining plate 36 is arranged in the upper casing 11 and a similar guide plate 37 is arranged in the lower casing 12. These retaining plates lie in a common vertical plane parallel to and secured against the inner faces of the two casing sections 11 and 12 and form in effect a single retaining plate with their adjacent edges substantially in contacting relationship as shown in Figure 3. Screws or similar fastening elements 38 may be employed for securing the retaining plates in position. The upper retaining plate 36 is provided with a horizontally elongated opening 39 which is of sufficient width to embrace both units of the successive article holders. Referring to Figure 3 it will be apparent that the height of the opening 39 is approximately equal to the open end of each article holder and since the units of the article holders are arranged in staggered relationship, the successive steps in the movement of the chain, which takes place in a manner to be described, will alternately discharge bottles or other articles from the units 28 and 29.

Any suitable mechanism may be employed for advancing the chains 25 in a step by step movement to move alternate successive units 28 and 29 into registration with the discharge opening 39. A disk 40 is fixed to and rotates with one of the upper sprockets 23 and is provided at its edge with radially extending lugs 41. A lever 42 is pivotally supported at one end by the shaft 21 and is urged upwardly by a suitable spring 43. A handle lever 44 is provided with an angular portion 45 pivoted as at 46 to the free end of the lever 42. The handle lever is provided with a notch 47 engageable with the lugs 41 upon downward movement of the handle lever, this element extending through an opening 48 formed in the side of the upper casing 11 (Figure 1). A torsion spring (not shown) may be employed for urging the handle lever 44 upwardly toward its normal position. In view of the nature of the chains and associated elements operation of the handle lever 44 will not generate momentum in the parts to tend to carry them beyond their intended positions, and accordingly no means need be provided for normally holding the chains against movement or for preventing the overrunning of the chains. The opening 48 is of such length as to permit the handle lever 44 to move the proper distance to bring the next unit 28 or 29 into registration with the opening 39.

The door 14 is provided with a dispensing opening 49 (Figure 2) normally closed by a pivoted door 50 and through which articles are discharged from the opening 39 to a receiver 51. The opening 49 obviously is inclined to the same extent as the units 28 and 29, the degree of inclination being sufficient to insure the dispensing of the bottles or other articles by gravity as each successive unit 28 or 29 moves into alignment with the opening 39.

The form of the invention shown in Figures 7 to 10 inclusive is identical with the chain type of mechanism just described, except for the specific form of the article holder and the means for securing the article holders to the chains. The modified form of chain mechanism comprises a pair of chains 52 shown as having relatively shorter links than the chains 25, and adapted to pass around sprockets the upper of which is shown in Figure 7 and indicated by the numeral 53. At spaced points in their lengths each chain is provided with special links having outstanding lugs 54, the lugs of the two chains being arranged in aligned pairs as shown in Figure 9, for a purpose to be described.

Each article holder in the form of the invention shown in Figures 7 to 10 inclusive is indicated as a whole by the numeral 55 and comprises units 56 and 57 preferably formed of cast aluminum or a light alloy thereof. Each unit is offset from its associated unit in the same manner as the units 28 and 29 and for the same purpose, namely, to bring alternate units into registration with the vending opening of the retaining plate. Each unit 57 is preferably formed of a plurality of fingers 58. The unit 56 includes a pair of fingers 59 at the side thereof adjacent the unit 57, the opposite side of the unit 56 having a flat wall 60. Both units are provided with end walls 61 (Figure 8) having a central opening 62. The units 56 and 57 are substantially shorter than the units 28 and 29 the openings 62 being provided to receive the necks of bottles which are longer than the units.

Whereas the units in Figures 3 to 6 inclusive are preferably formed of sheet metal and welded together, thus spacing the inner limits of bottles in the two series of units, the form of the invention in Figures 7 to 10 inclusive permits the slight nesting of the units with respect to each other, thus economizing in space. In other words, each bottle in the units 57 will extend slightly between the adjacent pair of bottles in the units 56, as will be apparent.

The wall portion 60 of each unit 56 is provided with a groove 63 which is horizontal as indicated in Figure 9, the units themselves sloping, as previously stated, to discharge bottles or other articles therefrom by gravity. Each groove 63 receives a pair of the lugs 54 of the two chains, these lugs being secured in position against the inner face of the grooves by screws 64. Since the chains 52 are retained relatively tight and since the lugs 54 are rigid with their associated links of the chains, the article holders are held in proper positions with respect to the chains. The horizontal alignment of the pairs of links which carry the lugs 54 insures the proper passage of the chains around the sprockets without any tendency to distort the chains, as will be apparent.

The operation of the form of the invention shown in Figures 1 to 6 inclusive is as follows:

While the present invention is directed particularly to the conveying feature of the apparatus, the mechanism is particularly adapted for use as a dispensing apparatus for bottles of soft drinks and the like. The apparatus is intended to be used in stores and may be coin controlled in any suitable manner so as to permit customers to wait on themselves.

To dispense a bottle from the apparatus it merely is necessary for the operator to grasp the handle 44 and swing it downwardly, the engaging notch 47 first being brought into engagement with one of the lugs 41, whereupon further swinging movement of the lever 44 with respect to the lever 42 will be prevented. Further operation of the handle will then cause the lever mechanism and the disk 40 to rotate as a unit about the axis of the shaft 21. The length of the opening 48 handle 44 the proper distance to move the chains 25 one step and thus bring one of the units 28 or 29 into alignment with the dispensing opening 39 and thus dispense a bottle from the apparatus. (Figure 1) is such as to limit the travel of the It will be apparent that all of the mechanism of the apparatus is supported solely by the upper casing section 11, the lower ends of the chains passing around sprockets 24 being carried by the lower bracket section 18 which is free from the lower casing section 12. Accordingly the upper casing section 11 may be lifted vertically from the lower casing section without disconnecting any of the parts from the latter.

The article holders slope downwardly away from the open ends thereof on the ascending side of the apparatus, and each unit 28 and 29 is provided with a drain opening 35 to drain refrigerant from the article holders on the ascending side of the apparatus. The liquid is free to drain from the open ends of the article holders on the descending side of the apparatus, and on the latter side, the bottles engage the retaining plate 36 to be held in their respective holders until they are successively brought into alignment with the dispensing opening 39.

In Figures 7 to 10 inclusive a modified form of article carrier for the apparatus is shown. The article holders 27 in the form of the invention just described may be made of sheet metal with the units of each article holder welded or riveted together. In the form of the invention shown in Figures 7 to 10 inclusive the article holders may be made preferably from cast aluminum. Under such conditions each of the units may be formed with its sides made up of the fingers, as shown, thus greatly facilitating the drainage of refrigerant from the article holders. Moreover, each article holder may be cast with its two units integral with each other and in such case the relationship of the units may be such as to reduce the width of each unit in the manner previously described.

The bottle holding units 27 and 55 are both connected to their chains in such a manner as to facilitate the passing of the article holders around the sprockets. The line 33 in Figure 5 indicates the alignment of the pivots of the links connected to one of the article holders to permit the latter to pass smoothly around the sprockets without any binding action. The same result is accomplished with the arrangement shown in Figure 9 wherein the arrangement of the lugs 54 in the horizontal slot 63 pivots each carrier on a horizontal axis for proper movement around the sprockets, the article holders themselves being inclined in order to discharge articles from the apparatus by gravity as will be apparent.

Each form of the apparatus is efficient in operation and comparatively simple in construction. The apparatus lends itself particularly well to the use of a coin controlled mechanism whereby the apparatus may be placed in stores where clerks frequently are too busy to render efficient service in the dispensing of soft drinks, or in automobile service stations where attendants are not always available for dispensing soft drinks. In each form of the invention a simple step by step movement will dispense successive bottles and in each form the bottle holders may be quickly and readily filled with bottles when desired. For example, referring to Figures 1 and 3, it will be apparent that the door 14 may be unlocked and opened and with the handle 44 left in the released position, the operator may fill as many of the bottles holding units as may be accessible at the left hand side of the apparatus as viewed in Figure 3. The operator may then manually move the conveyor chain to bring additional empty bottle carriers into position, whereupon such carriers likewise may be filled. This procedure may be repeated until the entire apparatus has been filled, whereupon the door 14 may be closed and locked and the apparatus is ready for operation.

The chain type conveyor mechanism shown in the drawings is particularly desirable for use in a vending apparatus of this type. It will be noted that the apparatus has its greatest dimension vertically and is of quite limited width and depth, thus requiring very little floor space. It also will be apparent that the apparatus does not require any ejecting or discharging mechanism for the articles, the latter moving by gravity through the opening 39 (Figure 3) and thus out of the apparatus into the receiver 51 (Figure 1) as successive article carriers are brought into registration with the opening 39.

Attention is invited to the fact that the article carriers of each row, for example the article carriers 29, are arranged as close together as possible to carry as many bottles as possible on conveyor chains of a given length. By employing a second row of article carriers, mounted on the same conveyor chains, the capacity of the apparatus is doubled, the number of article carriers 28 and 29 being equal. Thus the apparatus contemplates the provision of a single chain mechanism or like conveyor with a single article discharge opening, together with a plurality of rows of article holders off-set vertically from each other so that they are brought singly into registration with the discharge opening.

It also will be apparent that the invention is such that vertical chains may be employed passing around sprockets rotatable on horizontal axes, with article holders inclined so as to feed the article toward the discharge opening by gravity. The arrangement of the aligned ears 30 and 32 (Figure 5) and the aligned lugs 54 (Figure 9), is such that the inclined article holders pass freely around the chain-supporting sprockets, the axis of the lugs 30 and 32 and each pair of lugs 54 being perpendicular to the conveyor chains and thus parallel to the axes of the sprockets.

While the apparatus has been particularly illustrated and described as a bottle conveying and dispensing mechanism, it will be understood that the apparatus is not limited to such use but may be employed for conveying and dispensing any desired articles.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. An article carrier for an article dispensing apparatus comprising a conveying device movable in a vertical plane, and a plurality of article holders carried and solely supported by said device, each article holder comprising a pair of off-set article holding units extending at an angle to the horizontal and each having an open end from which an article is discharged by gravity during a portion of the travel of each unit with the conveying device in which each article holder slopes downwardly toward its open end.

2. A conveying mechanism comprising a vertically arranged chain mechanism, vertically spaced sprockets around which said chain mechanism runs, and a plurality of article holders carried and solely supported by said chain mechanism and each comprising a pair of article holding units which are vertically off-set from each other in each vertical run of the chain mechanism and extend across said chain mechanism at an angle to the horizontal in each vertical run of the chain mechanism.

3. A conveying mechanism comprising a vertically arranged chain mechanism, vertically spaced sprockets around which said chain mechanism runs, and a plurality of article holders carried and solely supported by said chain mechanism and each comprising a pair of article holding units which are vertically off-set from each other in each vertical run of the chain mechanism and extend across said chain mechanism at an angle to the horizontal in each vertical run of the chain mechanism, each article holding unit having an open end whereby each unit tends to discharge an article therefrom in the vertical run of said chain mechanism in which the article holder slopes downwardly toward its open end.

4. An article carrier for an article dispensing apparatus comprising a pair of endless chains, spaced sprockets around which said chains pass, and a plurality of article holders carried by said chains, each article holder comprising a pair of article holding units and extending across said chains at an acute angle with respect thereto, means for connecting each article holder to the respective chains at spaced points on a line transversely thereof, and means spaced from said line for connecting each article holder to one of said chains.

5. An article carrier for an article dispensing apparatus comprising a pair of endless chains, and a plurality of article holders carried by said chains, each article holder comprising a pair of article holding units extending across said chains at an angle to the length thereof, and means for connecting each article holder to said chains on a common pivot axis transversely thereof, the successive holders being arranged in contiguous relationship and the units of each holder being off-set lengthwise of said chains approximately one-half of their width.

6. An article carrier for an article dispensing apparatus comprising a pair of endless chains, and a plurality of article holders carried by said chains, each article holder comprising a pair of article holding units extending across said chains at an angle to the length thereof, and means for connecting each article holder to said chains on a common pivot axis transversely thereof, each article holder being formed integral, with each unit having spaced fingers to surround an article therein.

7. An article carrier for an article dispensing apparatus comprising a pair of endless chains, and a plurality of article holders carried by said chains, each article holder comprising a pair of article holding units extending across said chains at an angle to the length thereof, and means for connecting each article holder to said chains on a common pivot axis transversely thereof, the successive article holders being arranged in contiguous relationship and the units of each holder being off-set lengthwise of said chains approximately one-half of their width, the units adjacent the chain and the units remote therefrom being arranged respectively in rows and the units of one row being so formed that articles therein partly nest between the units of the other row.

8. A conveying mechanism comprising a pair of vertically elongated chains movable in a vertical plane, vertically spaced pairs of sprockets around which said chains run, a plurality of article holders arranged adjacent the remote sides of said chains, each article holder comprising a plurality of article holding units each having an open end and being inclined from the horizontal in each vertical run of said chains whereby articles tend to move from each article holder by gravity in the vertical run of the chains in which the article holders slope downwardly toward their open ends, each article holder having one unit thereof provided with a flat face adjacent and contacting with said chains, and means for connecting each article holder adjacent the flat face thereof to the respective chains at spaced points on a line transverse thereto, and means spaced from said line for connecting each article holder to one of said chains.

JOHN B. BROCK.